United States Patent [19]

Yuter

[11] Patent Number: 4,694,486
[45] Date of Patent: Sep. 15, 1987

[54] COMBINED TELEPHONE-TABLE SYSTEM

[76] Inventor: Seymour C. Yuter, 407 Cedar Drive West, Briarcliff Manor, N.Y. 10510

[21] Appl. No.: 580,827

[22] Filed: Apr. 10, 1984

Related U.S. Application Data

[60] Division of Ser. No. 332,477, Dec. 21, 1981, which is a division of Ser. No. 173,037, Jul. 28, 1980, which is a continuation of Ser. No. 13,568, Feb. 21, 1979.

[51] Int. Cl.[4] .............................................. H04M 1/15
[52] U.S. Cl. ..................................... 379/110; 379/436; 379/438
[58] Field of Search .................. 179/81 B, 81 R, 81 C, 179/84 R, 84 L, 146 L, 2 R, 178, 179; 181/153; 362/88

[56] References Cited

U.S. PATENT DOCUMENTS

| | | | |
|---|---|---|---|
| D. 180,105 | 4/1957 | Schullian | D26/51 |
| D. 211,277 | 6/1968 | Layton | D26/104 |
| 1,164,563 | 12/1915 | Yates, Sr. | 179/147 |
| 1,171,745 | 2/1916 | Mundy | 179/147 |
| 1,447,531 | 3/1923 | Carlson | 179/147 |
| 1,765,699 | 6/1930 | Plym | 362/88 X |
| 1,841,618 | 1/1932 | Loughridge et al. | 362/86 |
| 2,559,045 | 7/1951 | Petel | 179/816 |
| 2,572,478 | 10/1951 | Hawkins | 179/178 |
| 2,960,576 | 11/1960 | Kath | 179/84 R |
| 3,194,952 | 7/1965 | Wells | 181/153 X |
| 3,227,802 | 1/1966 | Pressley, Jr. | 174/69 X |
| 3,585,303 | 6/1971 | Chieffo | 179/84 L X |
| 3,688,864 | 9/1972 | Guss | |
| 3,881,069 | 4/1975 | Ichikawa et al. | 179/81 B |
| 3,953,688 | 4/1976 | Rocha | 179/147 |

OTHER PUBLICATIONS

Lightcraft Outdoor Wall-mounted Lamp No. 371-2-0-78, (no publication date).

Primary Examiner—James L. Dwyer
Attorney, Agent, or Firm—S. C. Yuter

[57] ABSTRACT

The specfication and drawings disclose a combined telephone-lamp-speaker system for use in a restaurant having a telephone ordering system. An integral support structure is adapted to be supported on a table, or on a wall adjacent a table. Mounted on the support structure are a lamp enclosure, a telephone and a speaker. Telephone ring current detection means responds to telephone ring current to interrupt the lamp light to signal that the phone is being rung. The speaker is mounted wthin the lamp enclosure. Switching means permit the feeding of a telephone conversation into the audio amplifier which drives the speaker so that a telephone conversation can be played on the speaker. Additional disclosed features include a cable of sufficient length to extend via a hole in the table though a pedestal and past the pedestal's base to be plugged into the central cable system and then retracted beneath the base. Also disclosed is a lever-operated snap switch responsive to the telephone's ringer to interrupt the lamp light.

6 Claims, 11 Drawing Figures

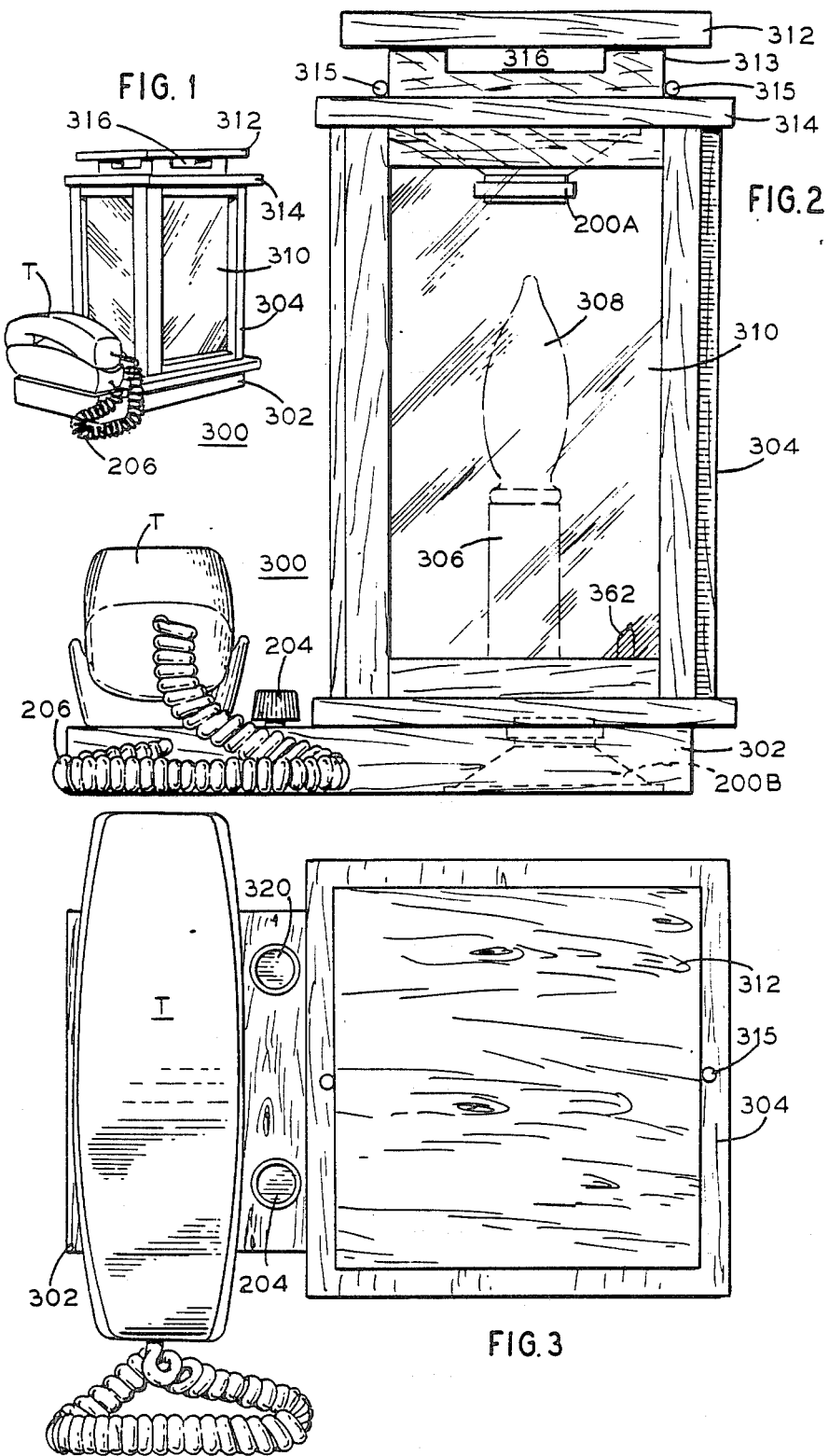

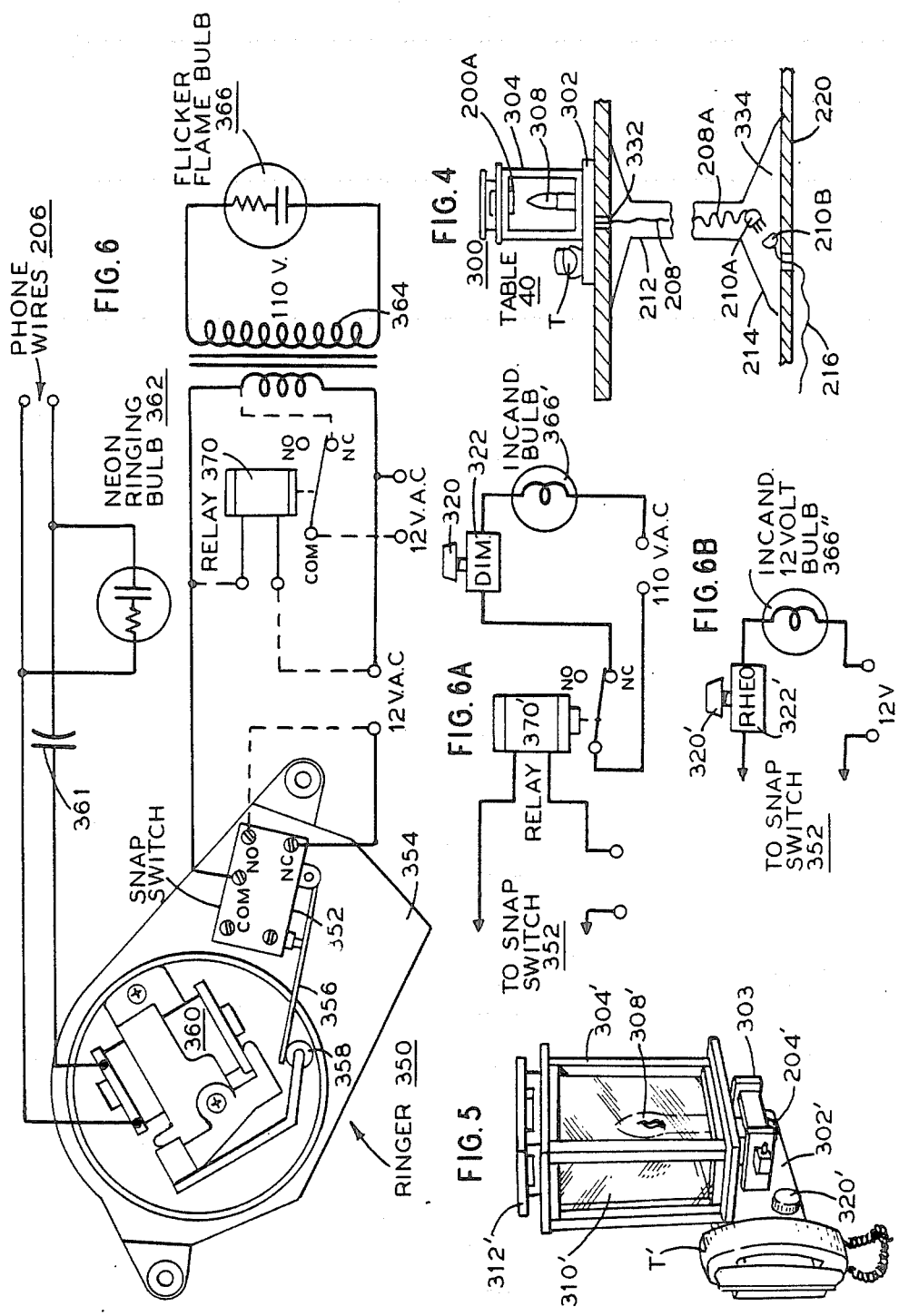

COMBINED TELEPHONE-TABLE SYSTEM

This is a division of application Ser. No. 332,477, filed Dec. 21, 1981, abandoned, in turn a division of application Ser. No. 173,037, filed July 28, 1980, abandoned, in turn a continuation of application Ser. No. 013,568, filed Feb. 21, 1979.

This invention relates to a combined telephone-table system and more particularly to an improved system for use with restaurant dining systems employing telephones to take food and beverage orders. Such a restaurant dining system is disclosed in the inventor's U.S. Pat. No. 4,074,793 granted Feb. 21, 1979 (herein "the '793 dining system patent"). Particularly relevant portions of that dining system are shown in FIGS. 7A and 7B of the accompanying drawings.

Briefly, the '793 patent discloses a dining system comprising dining and bar areas, a cocktail lounge, a kitchen, and an order-taking post separate from and adjacent the dining and bar areas to facilitate the direct delivery of food and drink orders taken by telephone from patrons in visual communication with the order-taking person. The patrons' telephones are on tables or wall-mounted. At the order-taking post is a telephone switchboard for calling patrons. Each table has its own speaker and volume control for music fed from an audio amplifier, preferably located at the order-taking post.

In such a dining system cables which connect the central telephone system to the table telephones run beneath carpet and exit at openings in the carpet to connect to the telephone cable. In such a system it is advantageous to be able to move tables from one location to a nearby location, for example to install additional tables in the restaurant. That requires the connecting cable for that table telephone to be reoriented under the carpet so as to exit at an opening in the carpet near the newly-located table base.

BRIEF SUMMARY OF INVENTION

The principal object of the invention is to provide both an improved telephone-table arrangement for use by patrons and a less-expensive installation procedure.

A specific object of the invention is to provide an efficient and convenient way to connect a table telephone cable to the connecting cable for that telephone.

These and other objects of the invention are achieved by a table top with an opening through which the cable of a telephone can pass to the underlying table pedestal, with the cable long enough so that it can extend past the pedestal base and its plug plugged into a socket of a cable connected to the central cable system. The cable is retracting so that it automatically withdraws the connected plug and socket beneath the base of the pedestal after being plugged into the central cable system.

Other objects, features and advantages of the invention will be apparent from the following detailed description taken together with the accompanying drawings.

BRIEF DESCRIPTION OF DRAWINGS

FIG. 1 is a perspective view of a combined telephone-lampspeaker unit adapted for a table top.

FIG. 2 is a front elevational view of the combined telephone-lamp-speaker unit of FIG. 1 with an incandescent bulb.

FIG. 3 is a plan view of the combined telephone-lamp-speaker unit of FIG. 1 showing the preferred Trimline-type phone.

FIG. 4 is a front elevational view of the combined telephone-lamp-speaker unit of FIGS. 1-3 and table, partly broken away, showing the unit's cable passing through an opening in the table top, through the pedestal for connection with the central cable system via the underlying carpet in accordance with the preferred embodiment of the invention.

FIG. 5 is a perspective view of the combined telephone-lampspeaker unit in accordance with the embodiment for wall mounting, with a Flicker Flame bulb which electrically simulates a burning candle.

FIG. 6 is a partly plan view and partly schematic circuit of the telephone ringer conversion device and associated circuitry for interrupting the light emitted from a Flicker Flame bulb when the telephone is rung.

FIG. 6A is a schematic circuit for a modification of the FIG. 6 light interruption circuit for use with a 110 volt incandescent bulb and associated dimmer.

FIG. 6B is a schematic circuit for a modification of the FIG. 6 light interruption circuit for use with a 12 volt incandescent bulb and associated rheostat.

DETAILED DESCRIPTION

Figure 7A:
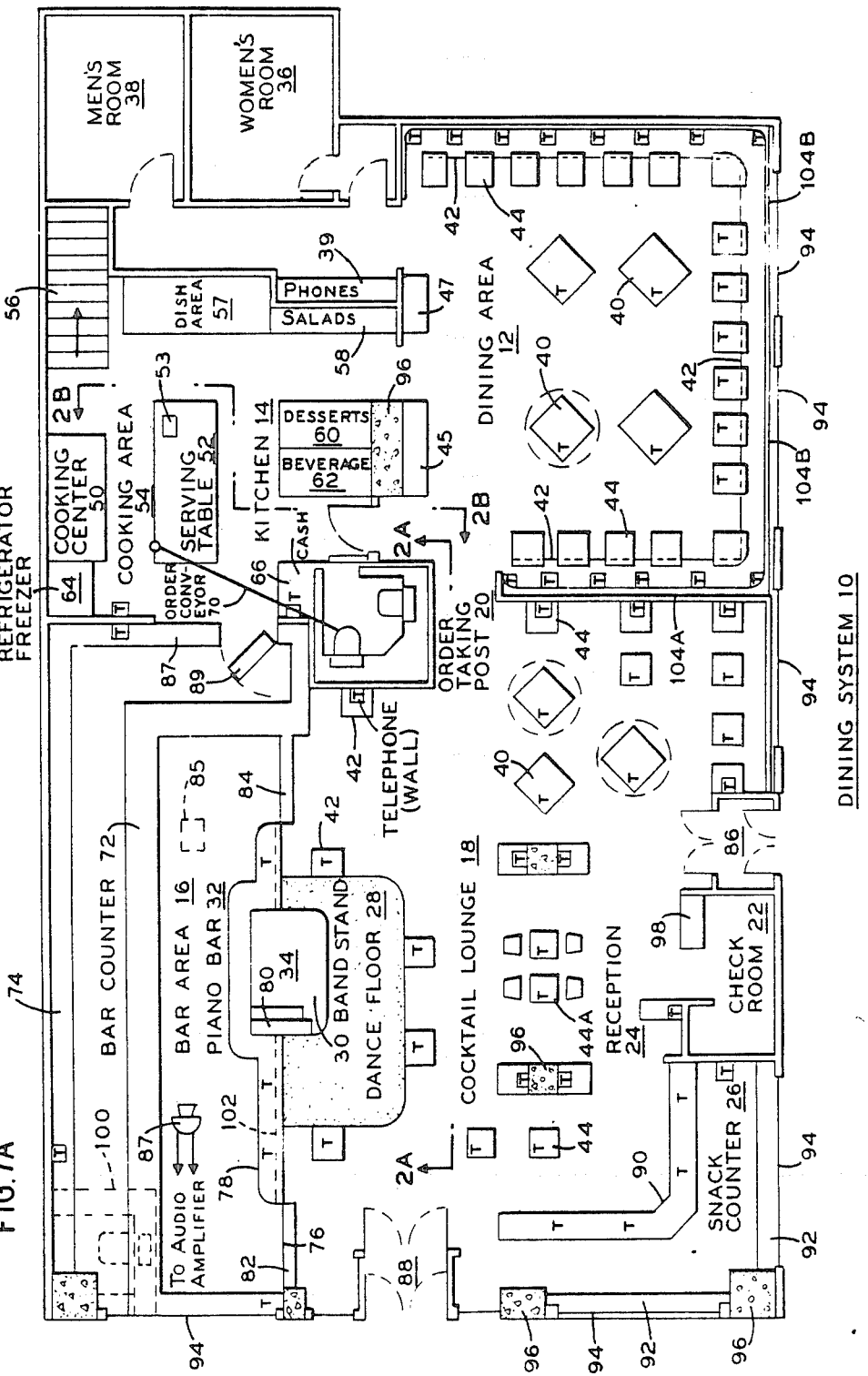
FIG. 7A is a copy of FIG. 1 of the inventor's '793 dining system patent showing a floor plan of the restaurant in which the present invention may be employed.

The specification and drawings of the inventor's U.S. Pat. No. 4,074,793 issued Feb. 21, 1978 for a Restaurant Dining System are hereby incorporated by cross reference. Corresponding parts of that System described in this detailed description are designated by the same reference characters as in the '793 patent.

Figure 7B:
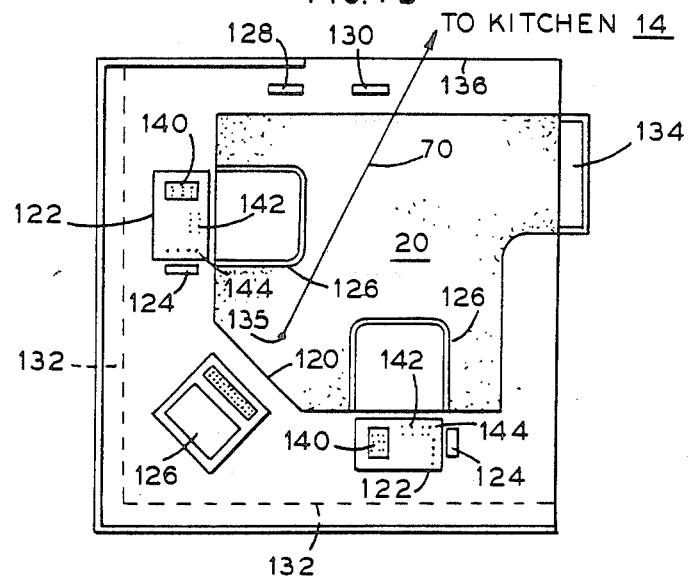
FIG.7B is a copy of FIG. 3 of the '793 patent showing a detailed plan view of the order-taking post of the restaurant.

Referring to the '793 dining system 10 in FIG. 7A, patrons' food and beverage orders are taken by an order-taking person seated in order-taking post 20 (detailed in FIG. 7B) by that person dialing the telephone number of the patron's table. The written order is then conveyed to the bar or kitchen. Music is fed from an audio amplifier to an individually controlled speaker mounted beneath each table top (not shown in FIG. 7). Locating the audio level control beneath the table is somewaht awkward and the volume from the speaker has to be high enough to reach a comfortable level at the patron's ears. This may tend to disturb nearby patrons who prefer to turn the music off and carry on a quiet conversation. Even so, it is a far improvement over ceiling speakers designed to broadcast music to a much larger group of patrons in a conventional restaurant.

Referring to FIGS. 1-3, the combined telephone-lamp-speaker unit 300 generally comprises an integral support base 302 on which is attached the telephone T and the lamp enclosure 304. The telephone T is of the known Trimline type and its base is attached to the base 302.

Conventionally mounted within the lamp enclosure 304 is a bulb base 306 adapted to receive a bulb 308. The lamp enclosure 304 is substantially symmetrical with each of its four sides enclosed by plastic transparent panes 310. At its top is roof 312 attached via the member 313 to the cap 314. Cap 314 is connected to the main lamp enclosure body by ball headed screws 315. Member 313 has openings 316 on each of the four sides. The lamp enclosure itself (without the speaker) is old being part of an outside wall-mounted lamp, Model No. 371-20-78, made by Lightcraft of California, a division of Nutone-Scovill.

Mounted within lamp enclosure 304 is speaker 200A, positioned horizontally with its speaker cone facing upwards and encompassing an opening (not shown) in cap 314 in communication with openings 316 through which speaker audio waves pass. Openings 316 also permit the passage of heat produced by the bulb 308. Alternatively, the speaker may be mounted in base 302 as shown at 200B in FIG. 2; or both speakers 200A and 200B may be employed simultaneously.

Mounted through the inside floor of lamp enclosure 304 is a conventional neon ring current lamp 362 which emits light in unison with the ring current from the phone cable across which neon lamp 362 is bridged. Also mounted on base 302 is a speaker volume control (not shown in FIGS. 1-3 but shown as 202 in FIG. 8) with its knob 204 for controlling the audio level output of the speaker 200A.

Also mounted on base 302 is dimmer control knob 320 of a dimmer (not shown in FIGS. 1-3 but shown as 322 in FIG. 6A) for varying the light intensity of bulb 308.

In FIG. 4 the combined telephone-lamp-speaker unit 300 is screwed to table top 330 of table 40, positioned over opening 332 through which cable 208 passes.

Cable 208 comprises a plurality of pairs of wires respectively conducting the telephone signals (including the ringing current), the audio signals fed to the speaker 200A, a 12 volt AC source for the light bulb 308 and phone protection wires to signal the order-taking post 20 if the phone wire is cut. If both speakers 200A and 200B (FIG. 2) are included, the second speaker can be used for stereo audio in which case a second audio pair of wires is included in cable 208. Alternatively, the second speaker can be used for a separate audio channel--for example, to carry music when the primary audio channel is carrying a telephone conversation. In the case of dual audio channels a switch (not shown) is used for channel selection.

In FIG. 4 the supporting post 212 of the pedestal 214 is shown broken away for drawing convenience. In accordance with the preferred embodiment of the invention, cable 208 has a permanently coiled portion 208A which permits the attached male plug 210A to be drawn past the outer periphery of the base 334 of the pedestal 214 for connection to the mating female plug 210B. Plug 210B is connected to a flat multi-conductor cable 216 which is part of the central cable network. Cable 216 passes through an opening in carpeting 220 (as is described in the '793 patent).

If the table 40 is to be moved a short distance, it is tilted to permit reaching the plug 210 and pulling it out from under pedestal base 334 and the plug 210 is separated. Then the table 40 is moved near to the new location, the cable 216 is repositioned to exit under the pedestal base 334, the plug 210 reconnected, with the coiled portion 208A then contracting to pull the plug 210 beneath the base 334, whereupon the table 40 is positioned in the new location.

FIG. 5 shows the wall-mounted version of the combined telephonelamp-speaker unit 300 of FIGS. 1-3 with corresponding parts shown with the same reference number but with prime designations added. The main difference is that lamp enclosure 304' is connected to the vertical support base 302' by horizontal support member 303, and telephone T' is of the wall-hanging Trimline type; also neon ringing bulb 362 is mounted through the base 302' adjacent the telephone T' rather than within the lamp enclosure. The support base 302' is attached to the wall over an opening through which the unit's cable passes.

At the left of FIG. 6 is ringer 350 as it appears when it is removed from the base of the Trimline-type phone T and its brass encircling bell removed; also removed is an adjacent plastic spacer to make room for the snap switch 352. Snap switch 352 is screwed to the base plate of the ringer 350 in a position so that the spring loaded lever 356 of snap switch 352 rests against the striker 358 of the ringer 350. The solenoid coil 360 of the ringer 350 is connected to the phone wires 206 via the capacitor 361. Also connected across the phone wires 206 is neon ringing bulb 362. When ringing current is present on phone wires 206 the striker 358 repeatedly moves inward in response to the alternating ringing current, moving lever 356 correspondingly to repeatedly activate snap switch 352. At the same time the neon ringing bulb 362 flashes in known fashion. Also, the clicking of the snap switch 352 is discernible to a patron at the table, but the sound is not loud enough to lead patrons at adjacent tables to think their phone is ringing.

Another purpose of the snap switch 352 is to provide a light interrupting means to flash the bulb 308 (FIG. 2) to help insure that the patron knows the phone is being rung. Connected in series with a 12 volt AC source and the primary winding of stepup transformer 364 are terminal COM (common) and NC (normally closed) of snap switch 352. The transformer 364 steps the 12 volts up to 110 volts at its secondary which is connected across bulb 308, in this embodiment Flicker Flame bulb 366. Flicker Flame bulb 366 is a three watt neon bulb whose filament simulates a flickering candle in a known manner. The bulb 366 is normally on when no ringing current is present on the phone wires 206. Low wattage of bulb 366 is desirable to minimize heat within the lamp enclosure and minimize drying of the speaker cone.

When ringing current is present on phone wires 206, snap switch 352 is cyclically activated repeatedly opening the transformer 364 primary circuit so that the bulb 366 repeatedly blinks. Simultaneously with blinking of the blub 366 neon ringing bulb 362 flashes. And at the same time the snap switch 352 is clicking. Thus the ringing of the phone is signalled to the patron, and patrons at adjacent tables are not led to believe that their phones are being rung.

It should be noted that 110 volts is present in the support base 302 of the combined telephone-lamp-speaker 300 (FIG. 2). Also present in the base 302 are the telephone wires 206. It is essential that 110 volts are not in any way coupled to the phone wires 206. Such a coupling is prevented by the isolation of the phone wires 206 from the snap switch 352 by the striker 358 mechanism; and from the snap switch 352 to the transformer 110 v by the lever 356.

If additional isolation is desirable, there can be provided a relay 370 circuit shown in dotted outline in FIG. 6 connected to snap switch terminals in place of the circuit connection to the transformer 364. The primary of the transformer 364 is then connected in series circuit with the 12 volt source and the normally connected terminals COM-NC of the relay 370. The coil of relay 370 is connected in series with the 12 volt source and the COM and NO (normally open) terminals of the snap switch 352. When ringing current is present the snap switch repeatedly connects the COM terminal to the NO terminal closing the relay 370 coil circuit to repeatedly move the COM relay contact to the NO relay terminal repeatedly opening the 12 volt ciruit to the transformer 364 to repeatedly dim bulb 366.

Flicker Flame bulb 366, being of a neon type, requires a high voltage to ignite—12 volts is insufficient. Moreover, it doesn't radically blink when the ringing current is present, as is the case with an incandescent bulb. Nevertheless, the ambience of the flickering candle simultaion is desirable in some installations. The repetition rate of the blinking of Flicker Flame bulb 366 may be substantially reduced, and therefore made more noticeable, by operating relay 370 of FIG. 6 with an astable multivibrator connected to the snap switchinterrupted 12 volt source by an integrator. The integrated voltage turns on the multivibrator to connect the 12 volt source to the primary of transformer 364 at a much lower repetition rate. Alternatively, the well-known 555 timer can be used for the same purpose.

The FIG. 6A circuit uses a 110 volt incandescent bulb 366' with relay 370' coil circuit the same as is dotted in FIG. 6. A 110 volt source is used directly with a dimmer 322 to adjust the brilliance of the incandescent bulb 366'. The dimmer 322 is turned by knob 320. The dimmer 322 is especially desirable in the dining area portion of the restaurant (FIG. 7A) so that the available light can be increased when eating. The bulb 366' is normally on and when ringing current is present it clearly blinks.

The FIG. 6B circuit employs a 12 volt incandescent bulb 366" connected via the rheostat 322' directly across the COM-NC terminals of the snap switch 352. It is the least expensive arrangement and the bulb 366" clearly blinks when ringing current is present on phone wires 206. The rheostat 322' permits the bulb 366" to be dimmed when its knob 320' is turned in the proper direction.

Figure 8:
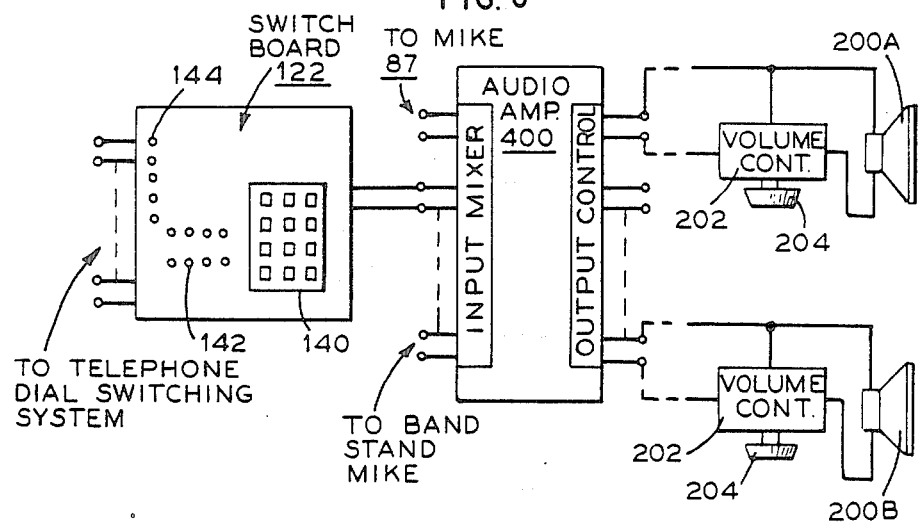
FIG. 8 is a schematic circuit of the portion of the system for coupling telephone conversations into the audio amplifier system feeding the speakers.

FIG. 8 shows the circuitry for feeding telephone conversations to the audio amplifier driving the speakers 200A. The switchboard 122 FIG. 7B) permits the order-taking person at the order-taking post 20 to dial via Touch-Tone button panel 140 any of the patrons' telephones via a well known telephone dial switching system. The switchboard 122 is connected between the telephone dial switching system and the input mixers of the audio amplifier 400. The output of the audio amplifier 400 drives the speakers 200A at the tables via the volume controls 202. The audio amplifier 400 has well known output controls for controlling the level of the audio signal fed to various speakers 200A.

Control button switches 144 permit transferring calls to an outside line or to the input of audio amplifier 400. The telephone circuitry for coupling a telephone conversation on a telephone line to the audio amplifier 400 is well known.

Other inputs to the audio amplifier are the bandstand microphone, and the mike 87 (FIG.7A) which feeds background noise from the bar area to the table speakers to simulate activity in the cocktail lounge when it is not too busy there (as described in greater detail in the '793 patent).

What is claimed is:

1. A combined telephone-table system comprising:
   (A) a table having a table top, pedestal and base, said base comprising a wall enclosing a space of substantially the same shape as said base;
   (B) an opening in said table top above said pedestal;
   (C) a single telephone unit solely positioned above the upper surface of said table top;
   (D) a first cable having a movable socket;
   (E) a second cable passing from said telephone unit through said opening and pedestal and terminating in said space enclosed by said wall of said base;
   (F) a movable plug attached to the end of said second cable;
   (G) retracting means associated with said second cable whereby said second cable when stretched will retract to substantially its original length when released;
   (H) said second cable and movable plug having a combined length which is sufficient when stretched for said movable plug to extend past the periphery of said base, and when released for said movable plug to retract past the periphery of said base into said space enclosed by said wall of said base;
   (I) whereby when said movable plug of said second cable is stretched past the periphery of said base and plugged into said movable socket of said first cable, said connected movable plug and movable socket will retract past the periphery of said base into said space enclosed by said wall of said base when said second cable is released.

2. The combined telephone-table system of claim 1 wherein said retracting means comprises a coiled portion of said second cable.

3. The combined telephone-table system of claim 1 wherein said telephone unit includes a lighting lamp and said second cable comprises a pair of wires for operating said telephone and a pair of wires for operating said lighting lamp.

4. The combined telephone-table system of claim 3 wherein said telephone unit further includes a speaker and said second cable further includes a pair of wires for operating said speaker.

5. The combined telephone-table system of claim 2 wherein said telephone unit includes a lighting lamp and said second cable comprises a pair of wires for operating said telephone and a pair of wires for operating said lighting lamp.

6. The combined telephone-table system of claim 5 wherein said telephone unit further includes a speaker and said second cable further includes a pair of wires for operating said speaker.

* * * * *